March 14, 1950     C. A. DE GIERS ET AL     2,500,348
TANK CONTENTS GAUGE WITH ATTITUDE CORRECTION
Filed Nov. 15, 1945
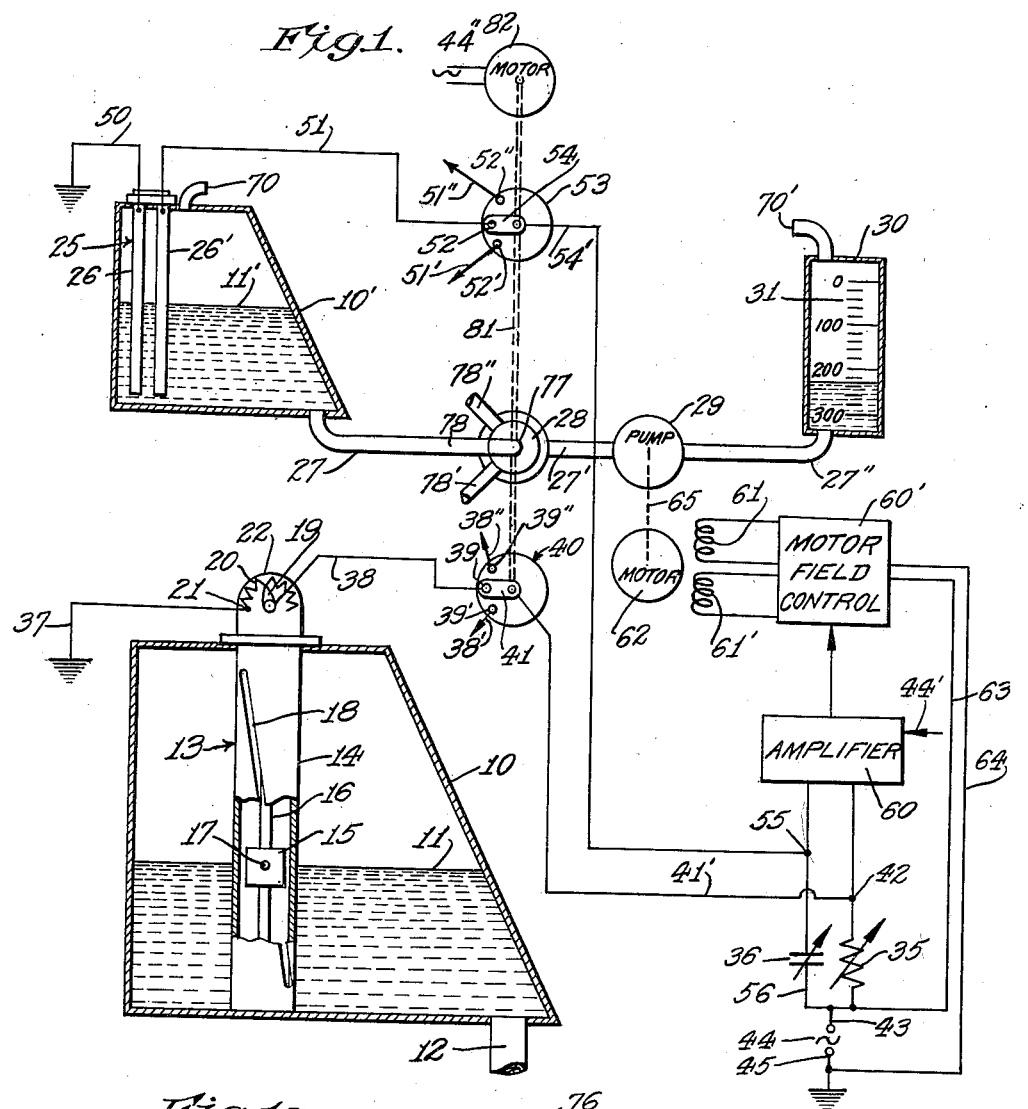
INVENTORS
CLARENCE A. DE GIERS
ABRAHAM EDELMAN
BY Ernest D. Given
ATTORNEY Patented Mar. 14, 1950

2,500,348

UNITED STATES PATENT OFFICE 2,500,348

TANK CONTENTS GAUGE WITH
ATTITUDE CORRECTION

Clarence A. de Giers, Forest Hills, and Abraham Edelman, New York, N. Y., assignors to The Liquidometer Corporation, Long Island City, N. Y., a corporation of Delaware Application November 15, 1945, Serial No. 628,842

2 Claims. (Cl. 73—313)

This invention relates to devices for measuring fluid in a tank and has particular reference to devices for measuring the liquid contents of fuel tanks of aircraft and other vehicles.

The correct measurement of the quantity of liquid such as gasoline in tanks of the type described offers considerable difficulties due to the shapes of the tanks, their location, etc. A further difficulty is caused by the movements of the liquid in the tank as a result of pitching, rolling and acceleration of the aircraft or other vehicles on which the tank is mounted. Liquid movements may occur during flight of the aircraft or while it is grounded. As a result, the distribution of the liquid inside the tank will vary. Such redistribution of the liquid, referred to hereinafter as a change of the "attitude" of the liquid level with respect to the tank, will cause substantial errors in the indications of indicating devices used for measuring of the liquid contents of the tank unless properly taken into consideration or neutralized.

An object of the invention is to provide a novel and improved measuring device permitting a convenient and accurate measurement of the liquid content of the tank.

Another object of the invention is to provide means increasing the precision with which the liquid contents of the tank may be measured.

Another object of the invention is to provide means making it possible to ascertain the volumetric measurement of the liquid contents of the tank without requiring an actual measurement of the entire liquid contents in the tank itself.

Another object of the invention is to provide means eliminating the need for a complicated calibration of instruments employed for volume measurement.

Another object of the invention is to provide means eliminating errors in the measurement of the liquid contents of the tank due to changes of the attitude of the liquid level with respect to the tank.

Another object of the invention is to provide a device indicating correctly the liquid content of the tank independently of movements of the liquid within the tank caused by tilting, pitching, rolling, acceleration, etc.

Other and further objects, features and advantages of the invention will be hereinafter described and pointed out in the appended claims forming part of the application.

According to a now preferred embodiment of the invention the previously mentioned and other objects hereinafter described are attained by providing a pilot structure shaped to form a replica of the tank, the liquid content of which is to be measured, and having the same attitude as the structure. This pilot tank is partially filled with a liquid, the surface of which is maintained at a level corresponding to the level of the liquid surface in the tank. An indicating means is provided for measuring the liquid content of the pilot structure which will bear a constant proportion or ratio to the volume of the liquid in the tank, so that measurement of the pilot structure content will also indicate the volume content of the tank, taking into consideration, of course, the proportion between the pilot structure volume and the structure volume which may be selected, for instance, to be 1:100. Since the pilot structure is comparatively small, its volume may be conveniently measured irrespective of changes in the attitude of the pilot structure liquid with respect to the pilot structure. Several arrangements may be provided for this purpose.

Errors in measurement caused by changes of temperature can be eliminated by employing in the pilot structure a liquid having the same coefficient of expansion with temperature as the liquid in the tank provided, of course, the pilot structure itself expands as does the tank and is subjected to the same temperature changes as the tank. Modifications of these requirements are readily apparent to a person skilled in temperature compensation and are not described herein in detail, not being part of the invention.

In the preceding description reference has been made mostly to the measurement of a liquid. However, it will be understood that the same difficulties and errors due to changes of attitude of a liquid relative to the tank are present in tanks which are filled with a material other than liquid that will change its attitude relative to the tank due to pitching, rolling, tilting, acceleration, etc. of the tank; such materials are, for instance, granular, muddy, or powdered materials. The invention as described herein is equally applicable to materials of this type.

The drawings accompanying and forming a part of this specification illustrate a preferred embodiment of the invention, but the invention is by no means restricted to what is there shown. The invention is capable of embodiments in other forms, all of the various embodiments coming within the claims appended hereto.

In the drawings:

Fig. 1 is a diagrammatic view of a measuring device according to the invention for volumetric measurement of the liquid content of a tank;

Fig. 1a is a modification of the indicator of the measuring device according to Fig. 1; and Fig. 1b is a second modification of the indicator of the measuring device according to Fig. 1.

Referring to Fig. 1 there is shown a main tank 10 having any desired shape and containing a fluid such as liquid, for example, gasoline, to be measured. In the illustrated example the tank 10 is filled up to the level 11. Tank 10 may be filled by any suitable means and emptied through a pipe 12.

The measuring and indicating device according to the invention comprises a pilot tank 10' which is internally an exact reproduction of the main tank and preferably fastened on the same supporting structure (not shown) so that the main tank and the pilot tank have exactly the same attitude as to all movements to which they are subjected. The pilot tank is of much smaller size than the main tank having for example 1% of the volume of the main tank 1. It should be understood that for clarity of illustration the pilot tank is shown in the drawings on a much larger scale than this.

The main tank includes a liquid level detecting device generally designated 13, which is shown dipping into the liquid. Any suitable liquid level detecting device may be used in the embodiment shown in Fig. 1. The detecting device as shown comprises an open casing 14 fastened to the walls of tank 10, so that the liquid level within the casing 14 is equal to the liquid level in the tank 10. A float 15 is slidable on a rotatable square rod 16 mounted concentrically to the walls of the casing 14. The float is guided by a pin 17 sliding in a helical slot 18 of the casing 14. As the liquid level in tank 10, and hence in casing 14 changes, the float will rise or sink correspondingly and also rotate due to the guidance of pin 17 in slot 18, thereby rotating the square rod 16 correspondingly. Rod 16 at its upper end is suitably connected to an electric contact arm 19 which engages an arcuate electric resistance strip 20 so that contact arm 19 will slide over the resistance strip as rod 16 rotates corresponding to the float movements. Consequently the resistance value between one terminal 21 of the resistance strip to the point of the resistance strip engaged by contact arm 19 varies with the liquid level. The resistance strip and the contact arm are mounted in a housing or compartment 22 provided at the top of casing 14.

It should, of course, be understood that the strip 20 and contact arm 19 are shown for clarity of illustration in an up-right position, while in practice they are preferably mounted parallel to the top of tank 11. Thus in practice the contact arm 19 may be rigidly carried by the rod 16.

The pilot tank 10' is also equipped with a liquid detecting device, which may be of the resistor type as has been shown and illustrated in connection with the main tank 10 or it may be of any other suitable type known in the art, provided it is located in the pilot tank in the same relative position as is the detecting device in the main tank. In Fig. 1 the pilot tank is shown as being equipped with a detecting device of the capacitance type generally designated 25. The detecting device comprises a pair of electrodes 26, 26' dipping into the liquid in the pilot tank and forming a capacitor. The liquid in the pilot tank has been illustrated as having a level 11'.

If the liquid in the pilot tank is a non-conducting one such as gasoline and has a dielectric constant larger than that for air (the dielectric constant of gasoline is approximately 2.0 and the dielectric constant of air is 1.0), the capacitance between the electrodes 26, 26' will increase or decrease corresponding to a rise or fall of the liquid level in the pilot tank. If the liquid in the pilot tank is a conducting one, the electrodes should be coated with an insulating layer, thereby blocking any current flow other than a capacitative current flow. It will be obvious that if the electrodes 26, 26' have the same widths throughout their heights, then the capacitance of the capacitor 25 will change proportionally to a change of the liquid height.

It should be noted that a capacitative detecting device as shown for the pilot tank can also be installed in the main tank instead of the resistance device illustrated and that either a capacitative detecting device or a resistance type detecting device can be used for either tank.

The pilot tank is connected by a pipe 27, a multiple valve generally designated 28, a pipe 27', a pump 29 and a pipe 27'' to a receptacle 30 shown as a cylindrical container.

The purpose and arrangement of the multiple valve 28 will be explained hereinafter; and for the time being it may be disregarded and the device will be described as if pipes 27 and 27' were connected directly.

Receptacle 30 is partly filled with the same liquid as is in the pilot tank 10' and the level of the liquid in receptacle 30 will be controlled by the level of the liquid in the pilot tank (as will be more fully explained hereinafter). Receptacle 30 is suitably calibrated, for instance by being provided with a volumetric scale 31, such as gallons of liquid, so that the receptacle 30 serves as indicator of the liquid contents of pilot tank 10', which in turn corresponds to and is controlled by the liquid contents of the main tank 10 as will be subsequently explained.

For the purpose of controlling the liquid levels in the pilot tank and the receptacle 30, the variable resistance element controlled by the detecting device 13 and the variable capacitance element comprising the detecting device 25 are connected as two arms of a resistance-capacitance bridge, the two other arms of which include a resistor 35 and a capacitor 36. Conventional means may be provided to adjust the resistance and capacitance values respectively of all four bridge arms independently of each other. The connections between the arms of the bridge are accomplished by connecting terminal 21 of resistor 20 to ground by a lead 37 and by connecting sliding contact arm 19 by a lead 38 to a contact 39 of a multiple switch generally designated 40. Contact 39 is shown as being engaged by a sliding contact arm 41 of the multiple switch, which is connected by a lead 41' to one terminal 42 of resistor 35. The other terminal of the resistor is connected by a lead 43 to one terminal of an A.-C. source of current 44, the other terminal of which is grounded by a lead 45.

The electrode 26 of capacitor 25 is grounded by a lead 50 and the second electrode 26' is connected by a lead 51 to a contact 52 of a multiple switch generally designated 53. Contact 52 is shown as being engaged by a sliding contact arm 54 of the multiple switch, which arm is connected by a lead 54' to one terminal 55 of capacitor 36. The other terminal of the capacitor is connected by a lead 56 to the supply lead 43.

The purpose and arrangement of multiple switches 40, 53 will be subsequently described; and for the time being the switches may be disregarded and the circuit considered as if leads 38, 41' and 51, 54' respectively were connected directly.

As will appear from the previously described circuit system, a resistance-capacitance bridge is formed consisting of two capacitors 25, 36 connected in series across the current supply 44 and two resistors 20, 35 connected in series across the current supply 44.

The output of the bridge circuit is taken from the junction points 55 and 42 to an amplifier 60 of conventional design which will amplify the output of the bridge. It will, of course, be understood that the amplifier requires an auxiliary current supply, which is indicated by numeral 44'.

The output of the bridge circuit and hence also the output of the amplifier are controlled by the relations between the electrical values in the bridge arms which, as previously mentioned, may be adjusted independently of each other. The resistance value of resistor 20, however, is also controlled by the liquid level 11 in the main tank as previously explained and the capacitance value of capacitor 25 is also controlled by the liquid level 11' in the pilot tank or structure.

Assuming now that the resistance element 20 is uniformly wound with resistance wire and that the rotation of rod 16 is uniformly proportional to the liquid level 11, then the resistance of resistor 20 in the bridge circuit will be directly proportional to the liquid height in the main tank 10. Similarly assuming that as previously mentioned the electrodes 26, 26' being of the same widths throughout their heights the capacitance in the bridge circuit will vary in a manner directly proportional to the liquid height in the pilot tank. By simple adjustments it will be possible to cause the bridge to balance whenever the liquid level 11' in the pilot tank is in proportional relationship to the liquid level 11 in the main tank for all liquid levels within the range of measurement of the device. Furthermore, whenever the liquid level 11' is too low relative to the liquid level 11, the unbalance of the bridge will be in opposite phase to when the liquid level 11' is too high relative to liquid level 11. This phase relationship will affect the amplifier 60 correspondingly. Amplifier 60 controls a motor field control 60', which in turn controls the circuit connections of the two reversing windings 61, 61' of a reversible pump motor generally designated 62. The motor field control 60', which is of conventional design and hence diagrammatically indicated by a rectangle, is connected to the current supply lead 43 by a lead 63 and to the grounded lead 45 by a lead 64. The motor field control 60' will compare the phase of signals received from the amplifier 60 with the constant phase of the current supply 44 and by means of conventional discriminating circuits such as relay circuits or electronic circuits will close an energizing circuit either for the field winding 61 or the field winding 61' according to the phase of the signals which it receives from amplifier 60. If the bridge is in balance, so that no signals are received from the amplifier 60, the motor field control will either deenergize both field windings or energize both field windings, so that the motor field is stationary. In either case motor 62 will remain at rest.

The motor 62 is mechanically coupled by suitable transmission means 65 (diagrammatically indicated by a dotted line) with the pump 29. If the bridge is unbalanced the motor will rotate in one or the other direction and operate the pump accordingly. The direction of motor rotation and the operation of the pump are arranged in a manner well known in the art, so that the pump will pump liquid from the receptacle 30 into the pilot tank through pipes 27, 27', 27'' when the liquid level in the pilot tank 10' is lower than corresponds to the liquid level in the main tank, and pump liquid from the pilot tank into the receptacle 30 when the liquid level in the pilot tank is higher than corresponds to the liquid level in the main tank.

The pilot tank is provided with a vent 70 and the receptacle 30 with a vent 70'. These vents may be left open or connected with each other thereby providing a fully closed system preventing an evaporation of the liquid in the pilot tank and in the container 30.

As will now be readily understood the previously described control means such as the bridge circuit and the pump controlled thereby will maintain the liquid level 11' in the pilot tank in close correspondence with the liquid level 11 in the main tank practically at all times. Furthermore, the control of the pilot tank level will not be affected by or be dependent upon variations in the liquid attitude of the two tanks. As was previously mentioned, both tanks are preferably fastened to a common support so that a pitching or rolling movement or other tilting movement common to both tanks will have the same effect on the attiude of the liquid in both tanks.

The control of the pilot tank level can be maintained to any desired degree of precision and will, of course, depend on the sensitivity of the level detecting devices and the associated control system including bridge, amplifier, motor and pump. The previously explained, close correspondence between the pilot tank liquid level and the main tank liquid level has the effect that the volume of liquid contents in the pilot tank will have the same proportion to the volume of liquid contents in the main tank as the total volume in the pilot tank has to the total volume in the main tank, which was assumed as 1:100 in the above description. Consequently, a measurement of the liquid contents of the pilot structure when multiplied by the constant factor "100" will become a measurement of the liquid contents of the main tank also.

For measuring the contents of the pilot tank several different methods and devices may be employed. As previously described, pilot tank 10' communicates with the calibrated container or reservoir 30 through pipes 27, 27' and 27'' including a pump 29 controlling the liquid level in the pilot tank and in the container corresponding to changes of the liquid level in the main tank. In order to calibrate the container 30, the pilot tank is first emptied by pumping all liquid from the pilot tank into the container 30. The quantity of liquid in the container is then adjusted until the position of its level corresponds to a calibration marked "0"' on the scale 31. Thereafter, liquid which is pumped into the pilot tank must simultaneously be removed from the container. Consequently, the graduations of volume on the container scale 31 shown inverted as may be seen in Fig. 1 will become measurements of the volume of liquid in the pilot tank and hence as previously explained in the main tank also.

Since the container 30 is likely to be subjected to the same changes in attitude as the tanks the contents of which it measures, the liquid level in the container 30, if measured by a scale provided on the walls of the container, may not always measure the content of the container 30 quite accurately. The effect of tilting movements of the indicating container 30 can be eliminated or reduced by various means, for example, by marking the scale 31 not on the walls of the container but on a rod located concentrically within the container.

An alternative arrangement for increasing the accuracy of determining the contents of container 30 is shown in Fig. 1a. Container 30 is here illustrated as a long coiled, capillary tube 30' connected at one end to pipe 27" and provided at the other end with a vent 71' corresponding to vent 70'. A scale 31' corresponding to scale 31 is marked on the tube or associated therewith. As will be readily understood the liquid level in tube 30' will be not or very little affected by changes in the attitude of the tube. The reading of the position of the liquid level or surface in tube 30' may be facilitated by suitably coloring the liquid used therein.

The previously described arrangements for measuring the liquid contents in the indicating container and hence in the tanks associated therewith were based on volumetric measurements and may be broadly defined as hydraulic arrangements. However, other arrangements which may be broadly defined as mechanical arrangements may of course also be employed. Fig. 1b shows an arrangement in which the weight of the entire indicating container and its contents are measured. Since the weight of the container 30" is known and constant, the weight of the liquid in the container can then be conveniently ascertained by weighing the more or less filled container and calibrating the scale in suitable units.

The arrangement illustrated in Fig. 1b comprises a container 30" connected to pipe 27" and provided with a vent 70' or 71' corresponding to vent 71. Container 30" is suspended by means of a suitable weighing device such as a spring scale 75 from a stationary support 76. The weighing device 75 is calibrated with a suitable scale 31'" corresponding to scale 31 and showing the liquid content in container 30". It will be understood that this arrangement makes it unnecessary to observe the liquid level in container 30.

Another arrangement for increasing the accuracy with which the contents of the indicating container may be determined is to suspend the entire container as a pendulum, for instance, the suspension shown in Fig. 1b may be considered as a pendulum, and a scale 31 may then be provided on the walls of the container 30" or associated therewith. Due to the pendulum suspension, the liquid level in the container will now remain parallel to the graduations and perpendicular to the axis of the container, and may be read more accurately.

In case of a suspension as shown in Fig. 1b a section of the connecting pipe 27" should be flexible, so that the pipe does not impede free movements of the container 30" as the latter tends to remain vertical.

As will be understood, the liquid content of the main tank which may be used, for instance, to feed a combustion motor will, in practice, change only slowly; and the control system as previously described will cause the pump 29 to operate only part of the time. Consequently, it is entirely practical to control the liquid levels in a plurality of pilot tanks each corresponding to a main tank. It will, of course, be understood that a slight time delay in correcting each individual pilot tank may have to be accepted. If then one indicating container is employed for several pilot tanks the graduations on the indicating container will indicate the total contents of all the pilot tanks and therefore of the corresponding main tanks also. In such arrangement the same volume ratio, previously selected as 1:100, must of course, be maintained for all the tanks associated with the same indicating container.

For the purposes aforesaid the previously mentioned multiple switches 40, 53 and the multiple valve 28 are provided.

The multiple switch 40 has a number of contacts 39, 39' and 39" each connected to respective wires such as 38, 38', 38" which in turn are connected to respective contact arms such as 19. Multiple switch 53 is similarly arranged and has a number of contacts 52, 52', 52" each connected to respective wires 51, 51', 51", which in turn are connected to respective electrodes such as 26'. The contact arms 41 and 54 respectively are arranged to engage slidably one of the respective stationary contacts.

Multiple valve 28 is preferably a rotary valve of conventional design having a central port 77 connecting with pipe 27' and a plurality of ports 78, 78', 78". Each of the latter ports communicates with a pipe such as pipe 27 extending to a pilot tank such as 10'. As is indicated in the drawings, central port 77 will connect pipe 27' with one of the pipe sections connecting with the ports 78, 78', 78" depending on the position of the rotary valve. In the position illustrated central port 77 connects with port 78 and hence pipe 27' communicates with pipe 27.

The contact arms 41, 52, of the multiple switches and the rotary member of the multiple valve are adjusted so that the contact arms will engage the corresponding stationary contacts when the central port 77 communicates with one of the pipes such as 27. For instance, as illustrated, the contact arms engage contacts 39 and 52 when center port 77 communicates with port 78. The two multiple switches and the multiple valve are coupled by mechanical transmission means which are diagrammatically shown and indicated by numeral 81 to a motor 82 operated by means of a suitable source of current such as 44". The motor will rotate the two contact arms and the rotary member of the valves at a suitable slow rate, so that the two contact arms and the rotary valve member moves in synchronism with each other from one of the previously explained positions to the other, thereby connecting the various tanks to be supervised temporarily with the control system.

If now, as previously assumed, the changes in the liquid contents in the respective main tanks occur slowly, the pump 29 can correct the liquid contents of the corresponding pilot tanks during the small interval during which the pump operation is controlled by the then connected tank.

It will, of course, be understood that the speed of the motor 82 and the size of the coacting contact surfaces and ports may be selected so that sufficient time is available for the correction of the liquid in the pilot tanks.

Since, as previously explained, the liquid for all pilot tanks is pumped to and from a single indicating container it is readily apparent that the volume of liquid remaining in the container will indicate the total volume of liquid present in all of the pilot tanks combined. The scale indication at the indicating container whether obtained by volumetric measurement, by weighing or by any other suitable arrangement can be taken as a measure of the total contents of all the pilot tanks and hence also of all the main tanks. In other words, the arrangement as has been described operates as a totalizing arrangement.

While the invention has been described in detail with respect to certain preferred examples and embodiments, it will be understood by those skilled in the art after understanding the invention that various changes and modifications may be made without departing from the spirit and scope of the invention and it is intended, therefore, in the appended claims to cover all such changes and modifications.

What is claimed is:

1. Device for measuring the total fluid contents in a plurality of tanks comprising a plurality of pilot tanks each shaped to form a replica of a main tank on a reduced scale, a receptacle capable of containing a supply of fluid, means for successively connecting each pilot tank with said receptacle, a pump means for pumping fluid from the receptacle to a connected pilot tank and vice versa, a means to control the operation of the pump means for maintaining the fluid level in each pilot tank corresponding to the fluid level in the respective main tank, and a means for measuring the fluid contents in the receptacles, said fluid contents being indicative of the total fluid contents in the pilot tanks and in the main tanks.

2. Apparatus for measuring the fluid contents of a plurality of tanks in accordance with claim 1, wherein said means to control the operation of the pump means comprises a reversible electric motor, an electric control system for controlling the operation of said motor, fluid level responsive means in each of said plurality of tanks, fluid level responsive means in each of said pilot tanks, all said fluid level responsive means being arranged to affect an electric circuit connected thereto, and means for successively electrically connecting the fluid level responsive means of each of said tanks and that of its respectively associated replica pilot tank to said electric control system concomitantly with the connection of each pilot tank with said receptacle respectively.

CLARENCE A. DE GIERS.
ABRAHAM EDELMAN.

REFERENCES CITED

The following references are of record in the file of this patent:

UNITED STATES PATENTS

| Number | Name | Date |
| --- | --- | --- |
| 8,088 | Faber | May 13, 1851 |
| 2,116,636 | Neumann | May 10, 1938 |
| 2,378,849 | Helleberg et al. | Jan. 19, 1945 |
| 2,405,689 | De Giers | Aug. 13, 1946 |
| 2,423,875 | Curtis et al. | July 15, 1947 |

FOREIGN PATENTS

| Number | Country | Date |
| --- | --- | --- |
| 484,764 | Great Britain | May 10, 1938 |